United States Patent
Shin et al.

(10) Patent No.: US 12,399,862 B2
(45) Date of Patent: Aug. 26, 2025

(54) METHOD FOR RECOVERING DATABASE FILE IN ELECTRONIC DEVICE

(71) Applicant: SAMSUNG ELECTRONICS CO., LTD., Suwon-si (KR)

(72) Inventors: Yoonho Shin, Suwon-si (KR); Kisung Lee, Suwon-si (KR); Hyeeun Jun, Suwon-si (KR); Hobin Woo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/107,424

(22) Filed: Feb. 8, 2023

(65) Prior Publication Data

US 2023/0259487 A1 Aug. 17, 2023

Related U.S. Application Data

(63) Continuation of application No. PCT/KR2023/001745, filed on Feb. 7, 2023.

(30) Foreign Application Priority Data

Feb. 8, 2022 (KR) .......................... 10-2022-0016389

(51) Int. Cl.
  *G06F 16/11* (2019.01)
  *G06F 11/14* (2006.01)
  *G06F 16/176* (2019.01)

(52) U.S. Cl.
  CPC ........ *G06F 16/122* (2019.01); *G06F 11/1469* (2013.01); *G06F 16/1774* (2019.01); *G06F 2201/80* (2013.01); *G06F 2201/84* (2013.01)

(58) Field of Classification Search
  CPC ............... G06F 16/122; G06F 16/1774; G06F 11/1469; G06F 2201/80; G06F 2201/84; G06F 17/30
  See application file for complete search history.

(56) References Cited

U.S. PATENT DOCUMENTS

| | | | |
|---|---|---|---|
| 11,757,914 B1 * | 9/2023 | Jakobsson | H04L 51/42 726/25 |
| 2005/0216462 A1 | 9/2005 | Xiao | |

(Continued)

FOREIGN PATENT DOCUMENTS

| | | |
|---|---|---|
| CN | 101976254 A | 2/2011 |
| CN | 112506710 A | 3/2021 |

(Continued)

OTHER PUBLICATIONS

International Search Report and Written Opinion for International Application No. PCT/KR2023/001745; International Filing Date Feb. 7, 2023; Date of Mailing May 15, 2023; 9 Pages.

(Continued)

*Primary Examiner* — Courtney Harmon
(74) *Attorney, Agent, or Firm* — CANTOR COLBURN LLP

(57) ABSTRACT

According to an embodiment, an electronic device includes a memory including a database file and at least one processor connected to the memory. The at least one processor may identify damage to the database file while a first application running on the electronic device accesses the database file. The at least one processor may control a second application running on the electronic device to wait without accessing the database file until recovery of the damaged database file is completed. The at least one processor may record recovery state information indicating that the database file is recovered if the recovery of the damaged database file is completed. The at least one processor may control the second application to access the recovered database file based on the recovery state information.

18 Claims, 18 Drawing Sheets

(56) References Cited

U.S. PATENT DOCUMENTS

| | | | |
|---|---|---|---|
| 2005/0246612 A1 | 11/2005 | Leis et al. | |
| 2007/0088970 A1 | 4/2007 | Buxton et al. | |
| 2011/0246503 A1* | 10/2011 | Bender | G06F 9/546 |
| | | | 707/769 |
| 2013/0227224 A1 | 8/2013 | Koinuma et al. | |
| 2016/0364158 A1* | 12/2016 | Narayanan | G06F 11/2094 |
| 2017/0192863 A1 | 7/2017 | Eluri et al. | |
| 2018/0276268 A1* | 9/2018 | Doval | G06F 11/0751 |
| 2018/0373877 A1* | 12/2018 | Bruso | G06F 21/552 |
| 2020/0034251 A1 | 1/2020 | Antonopoulos et al. | |
| 2020/0201718 A1 | 6/2020 | Richter et al. | |
| 2020/0265010 A1* | 8/2020 | Lee | G06F 16/252 |
| 2021/0165716 A1* | 6/2021 | Li | G06F 11/1474 |
| 2023/0342345 A1* | 10/2023 | Xiao | G06F 16/215 |

FOREIGN PATENT DOCUMENTS

| | | |
|---|---|---|
| JP | H07121419 B2 | 12/1995 |
| JP | H11134236 A | 5/1999 |
| JP | 2009163529 A | 7/2009 |
| KR | 20060004915 A | 1/2006 |
| KR | 20070031209 A | 3/2007 |
| KR | 20090114177 A | 11/2009 |
| KR | 100983300 B1 | 9/2010 |
| KR | 20130099801 A | 9/2013 |
| KR | 20210089266 A | 7/2021 |
| KR | 20230070986 A | 5/2023 |

OTHER PUBLICATIONS

Extended European Search Report corresponding to Application No. 23753116.5-1203; Dated Dec. 4, 2024.

* cited by examiner

METHOD FOR RECOVERING DATABASE FILE IN ELECTRONIC DEVICE

CROSS-REFERENCE TO RELATED APPLICATIONS

This application is a continuation application, claiming priority under § 365(c), of International Application No. PCT/KR2023/001745, filed on Feb. 7, 2023, which is based on and claims the benefit of Korean patent application number 10-2022-0016389, filed on Feb. 8, 2022, in the Korean Intellectual Property Office, the disclosures of which are incorporated by reference herein in their entireties.

TECHNICAL FIELD

An embodiment of the disclosure relates to a technique for recovering a database when damage occurs in the database operating in an electronic device.

BACKGROUND

With the development of digital technology, various types of electronic devices, such as mobile communication terminals, smartphones, tablet personal computers (PCs), and wearable devices, are widely used.

The electronic device may store various data to provide various user experiences. For the operation of various data, the electronic device may include a storage device layer including a main memory (e.g., random access memory (RAM)) and storage, which is a mass storage device, like a computer system does, and various data may constitute a database system implemented in various structures.

The electronic device may manage the data of one or more applications, services, and/or operating systems based on the database. For example, the electronic device may process the data of a database based on the running application, service, and/or operating system.

When the electronic device recognizes database damage, the electronic device may perform a recovery operation on the database. If the process (e.g., the application) accesses the database being restored while recovering the damaged database in the electronic device, an error may occur in the database recovery operation in progress.

Further, if the process accesses the database being restored while recovering the damaged database in the electronic device, the process may not normally recognize the database and a database error may occur.

BRIEF DESCRIPTION

Embodiments of the disclosure are not limited to the foregoing objectives, and other objectives would readily be appreciated by a skilled artisan from the following detailed description taken in conjunction with the accompanying drawings.

According to an embodiment, an electronic device includes a memory including a database file and at least one processor connected to the memory. The at least one processor may identify damage to the database file while a first application run on the electronic device accesses the database file, control a second application run on the electronic device to wait without accessing the database file until recovery of the damaged database file is completed, record recovery state information indicating that the database file is recovered if the recovery of the damaged database file is completed, and control the second application to access the recovered database file based on the recovery state information.

According to an embodiment, a method for operating an electronic device may include identifying damage to a database file while a first application run on the electronic device accesses the database file, controlling a second application run on the electronic device to wait without accessing the database file until recovery of the damaged database file is completed, recording recovery state information indicating that the database file is recovered based on identifying that the recovery of the damaged database file is completed, and controlling the second application to access the recovered database file based on the recovery state information.

According to an embodiment, a computer program product comprises a storage medium storing instructions configured to be executed by at least one processor of an electronic device to perform a plurality of operations. The plurality of operations comprising identifying that the database file is damaged while a first application running on the electronic device accesses the database file; controlling a second application running on the electronic device to wait without accessing the database file until recovery of the damaged database file is completed; recording recovery state information indicating that the database file is recovered if the recovery of the damaged database file is completed; and controlling the second application to access the recovered database file based on the recovery state information.

According to an embodiment, the electronic device may identify a database recovery operation or a database recovery state to reduce errors in the database recovery operation.

According to an embodiment of the disclosure, the electronic device may identify a database recovery operation to prevent conflicts and data errors between processes accessing the database being restored.

According to an embodiment, the electronic device may identify a database recovery state and prevent data loss when a process accesses the restored database.

DETAILED DESCRIPTION

Figure 1:
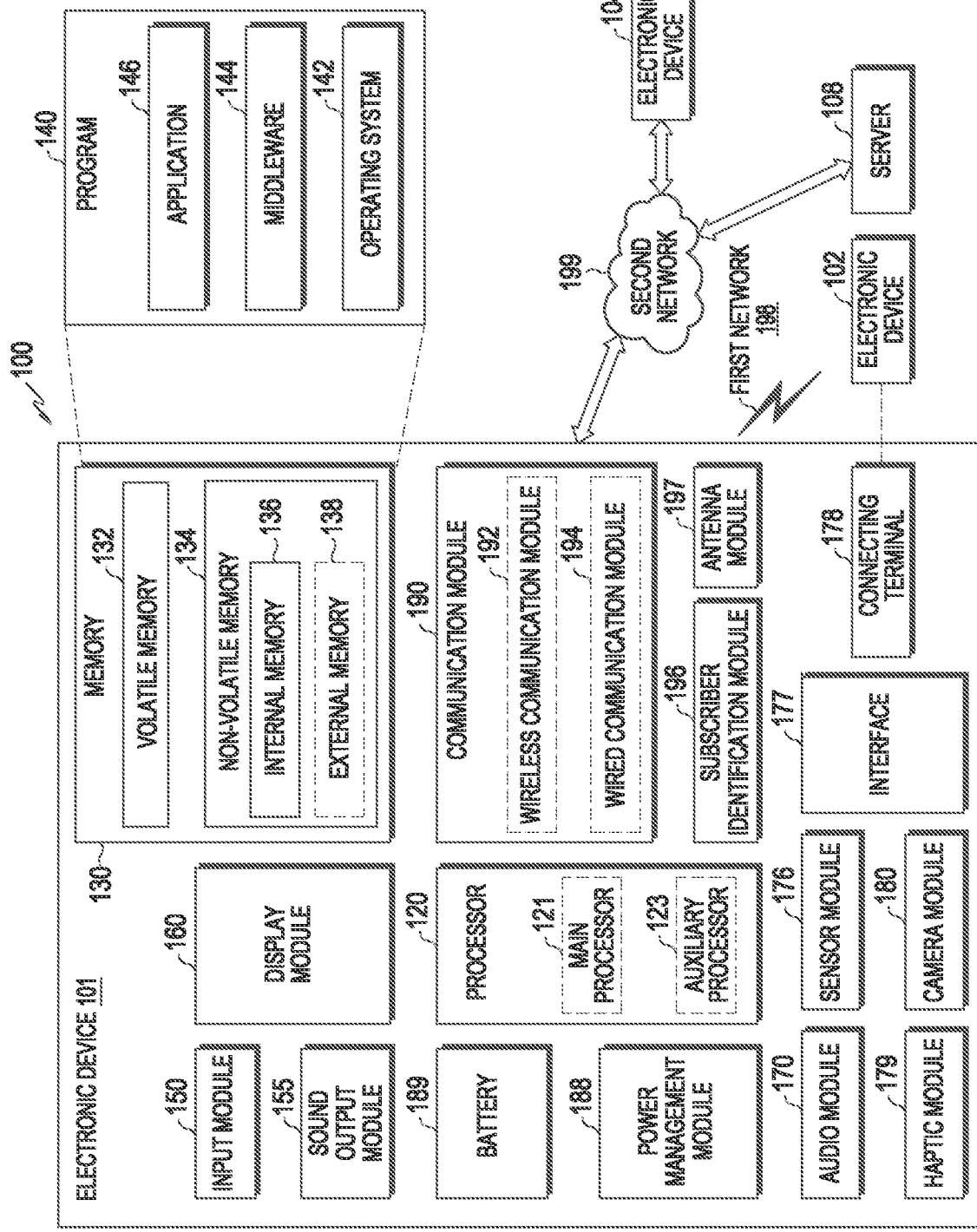
FIG. 1 is a block diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
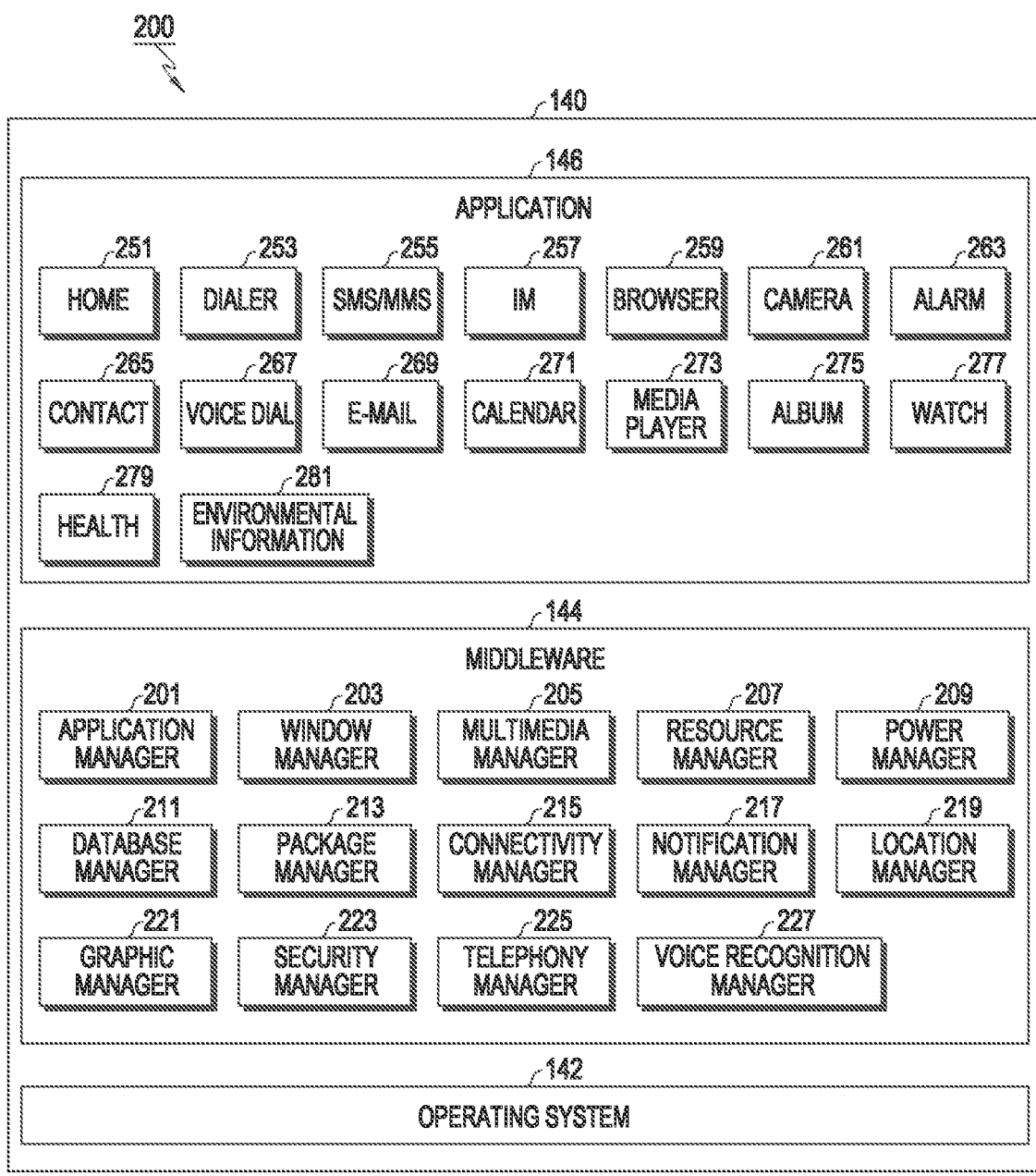
FIG. 2 is a block diagram illustrating an example of a program according to an embodiment.

FIG. 2 is a block diagram 200 illustrating the program 140 according to an embodiment. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
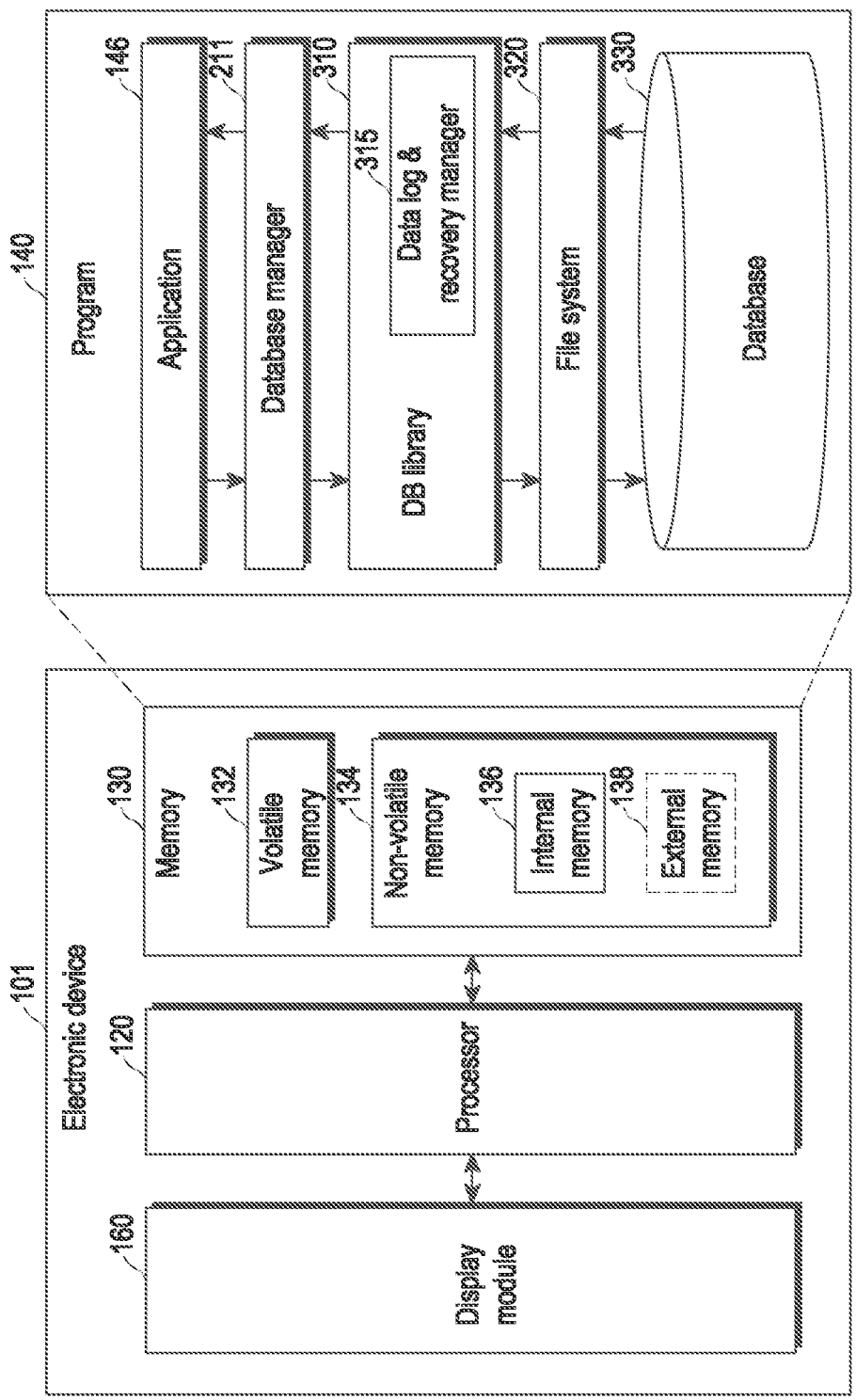
FIG. 3 is a view illustrating an example of an operation related to a database stored in an electronic device according to an embodiment.

FIG. 3 is a view illustrating an example of an operation related to a database stored in an electronic device according to an embodiment.

The electronic device 101 may correspond to at least one of a smartphone, a smart pad, a tablet PC, a personal digital assistance (PDA), a laptop PC, or a desktop PC. The electronic device 101 may include a processor 120, a memory 130, and a display module 160. The electronic device 101 may be at least partially identical to the electronic device 101 shown in FIG. 1.

According to an embodiment, the processor 120 may execute one or more instructions stored in the memory 130. The processor 120 may include at least one of circuits for processing data, e.g., an integrated circuit (IC), an arithmetic logic unit (ALU), a field programmable gate array (FPGA), and a large scale integration (LSI). The memory 130 may store data related to the electronic device 101. The memory 130 may include a volatile memory 132 or a non-volatile memory 134. The non-volatile memory 134 may be in the form of an internal memory 136 included in the electronic device 101 and/or an external memory 138 detachable to the electronic device 101.

According to an embodiment, the memory 130 may store instructions related to the application 146 and instructions related to an operating system (e.g., the operating system 142 of FIG. 1). The operating system may be system software executed by the processor 120. The processor 120 may manage the hardware components (e.g., the memory 130 of FIG. 1 to the antenna module 197 of FIG. 1) included in the electronic device 101 by executing the operating system. The operating system may provide an application programming interface (API) to the application 146 that is the remaining software except for the system software.

According to an embodiment, one or more applications 146 that are a set of a plurality of instructions may be installed in the memory 130. That the application 146 is installed in the memory 130 may mean that the application 146 is stored in a format that may be executed by the processor 120 connected to the memory 130.

According to an embodiment, the display module 160 may visually output information to the user through at least one of organic light emitting diodes (OLEDs), liquid crystal displays (LCDs), and light emitting diodes (LEDs). According to an embodiment, to more intuitively control the user interface (UI) output through the display module 160, the electronic device 101 may include a touch sensor panel (touchscreen panel, TSP) (not shown) disposed on the display module 160.

According to an embodiment, the program 140 may include a database manager 211 and/or a database (DB) library 310 to provide functions for performing data processing between the application 146 and the database 330. The DB library 310 may be included in middleware (e.g., the middleware 144 of FIGS. 1 and 2). The middleware may provide various functions to the application 146 such that a function or information provided from one or more resources of the electronic device 101, such as the database 330, may be used by the application 146. The electronic device 101 may create, search, or change the database 330 by the application 146 based on the database manager 211 and/or the DB library 310.

According to an embodiment, the DB library 310 may include a data log and recovery manager 315 that manages the modified data of the database 330 based on the application 146 and detects and recovers errors related to data modifications. According to an embodiment, when the function for processing or modifying the data of the database 330 included in the DB library 310 is executed based on the application 146 running on the electronic device 101, the electronic device 101 may access the data (or database file) included in the database 330 through the file system 320. When the data (or database file) is transferred from the file system 320 to the application 146, the electronic device 101 may ensure consistency and/or integrity of data based on the data log and recovery manager 315.

According to an embodiment, the electronic device 101 may manage the data stored in the storage based on the volatile memory 132 based on the file system 320. According to an embodiment, the electronic device 101 may manage the location where the data (e.g., file) of the database 330 is stored using the file system 320. According to an embodiment, the file system 320 may be included in the operating system.

According to an embodiment, the electronic device 101 may set at least part of the volatile memory 132 and/or non-volatile memory 134 of the memory 130, as storage. The storage may correspond to a storage area where data related to the electronic device 101 is stored. Hereinafter, the memory may refer to a portion of the volatile memory 132 and/or the non-volatile memory 134 that is distinct from the storage area. For example, the memory may correspond to a task area for processing data related to the electronic device 101.

According to an embodiment, the electronic device 101 may manage data related to the application 146 based on the database 330. The database 330 is a set of structured data and may refer to a set of data stored in storage based on a designated list or data structure.

According to an embodiment, applications and services installed in the electronic device 101 may operate based on the database 330. According to an embodiment, access to the database 330 by a plurality of different applications and services may occur frequently while the electronic device 101 is operating. According to an embodiment, the number of databases 330 stored in the storage of the electronic device 101 is not limited to the embodiment illustrated in FIG. 3, and may be plural.

According to an embodiment, in order for the electronic device 101 to execute the application 146 without an error, the electronic device 101 may guarantee data integrity that maintains data stored in the database 330 in a normal state while ensuring the atomicity of the transaction related to the database 330. Atomicity may mean that the results of computation of data of the database 330 based on all operations included in one transaction are all stored or none are stored in the database 330.

According to an embodiment, transaction may mean a unit of an operation performed to change the state of the database 330. According to an embodiment, a transaction is a logical unit of work (LUW) of operations related to the data of the database 330 and may be a unit of interaction between the application 146 and the database 330. The operation related to the data of the database 330 may mean, e.g., an operation for accessing the database 330 based on a structured query language (SQL), such as OPEN, SELECT, INSERT, DELETE, UPDATE, or CLOSE.

According to an embodiment, one transaction may mean a set of one or more operations and/or query words related to the data of the database 330. According to an embodiment, operations included in a transaction and related to the data of the database 330 may include a data read operation, data addition operation, data deletion operation, and data modification operation. Commit of a transaction may mean that all operations related to data included in the transaction have been successfully performed.

According to an embodiment, the electronic device 101 may guarantee the integrity and atomicity of data of the database 330 based on the database manager 211 and/or the data log and recovery manager 315. For example, the electronic device 101 may ensure the integrity and atomicity of the data of the database 330 by managing the modified data of the database 330 based on a journal scheme. The journal scheme may include a write-ahead logging (WAL) scheme and/or a roll-back scheme.

According to an embodiment, the electronic device 101 may include an SQLite-based database 330. The electronic device 101 may ensure the atomicity of the transaction by accessing the SQLite-based database 330 according to the WAL scheme.

Figure 4:
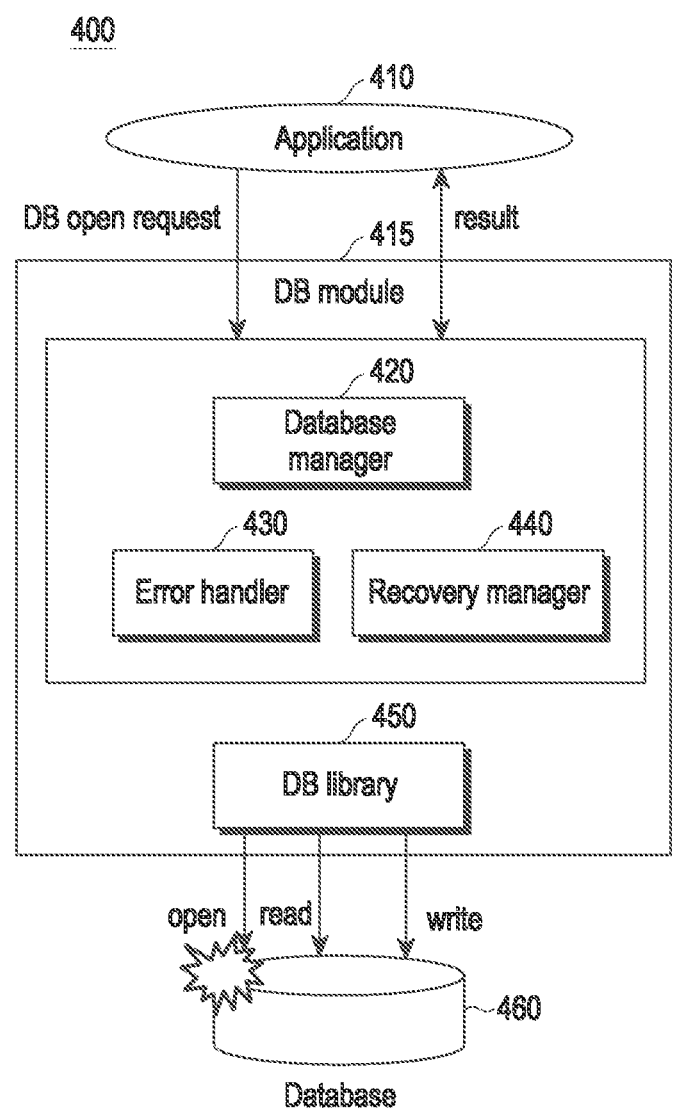
FIG. 4 is a view illustrating another example of an operation related to a database stored in an electronic device according to an embodiment.

FIG. 4 is a view illustrating another example of an operation related to a database stored in an electronic device according to an embodiment.

Referring to FIG. 4, an electronic device 400 (e.g., the electronic device 101 of FIG. 1 or the electronic device 101 of FIG. 3) may include an application 410, a database (DB) module 415, and a database 460. According to an embodiment, the DB module 415 may include a database manager 420 (e.g., the database manager 211 of FIG. 2 or the database manager 211 of FIG. 3) implemented on a first layer, an error handler 430 implemented on the first layer, a recovery manager 440 implemented on the first layer, and a DB library 450 implemented on a second layer. According to an embodiment, the first layer may be implemented as a java layer used on Android OS, and the second layer may be implemented as a native layer used on Android OS, for instance.

According to an embodiment, the DB module 415 may be implemented in the processor (e.g., the processor 120 of FIG. 1 or the processor 120 of FIG. 3) in the electronic device. According to an embodiment, the DB module 415 may provide a function for performing processing of data between the application 410 and the database 460. According to an embodiment, the DB module 415 may perform generation, search or modification of the database 460 by the application 410. According to an embodiment, the DB module 415 may detect and/or restore data file errors in the database 460 when accessing the application 410.

According to an embodiment, the application 410 may be implemented as the application 146 of FIGS. 1 to 3. According to an embodiment, the error handler 430 may be included in the database manager 211. According to an embodiment, the recovery manager 440 may be implemented as the recovery manager 315 of FIG. 3, and the DB library 450 may be implemented as the DB library 310 of FIG. 3, and the database 460 may be implemented as the database 330 of FIG. 3.

According to an embodiment, when the database engine used on the Android OS is SQLite, the database manager 420 may be implemented using an SQLiteDatabase, and the DB library 450 may be implemented as libsqlite.so. According to an embodiment, the database manager 420 may process a code set existing on the DB framework according to an open and/or query command for the database 460 performed by the application 410. According to an embodiment, the DB library 450 may be implemented on the native layer, where the programming language used in the Android OS is executed.

According to an embodiment, the application 410 may transmit a database open request to the DB module 415, and the DB module 415 may transmit an open, read, and/or write command to the database 460 through the file system (e.g., the file system 320 of FIG. 3). According to an embodiment, the DB module 415 may transmit, to the application 410, result information according to the open, read, and/or write command transmitted to the database 460.

According to an embodiment, the database file in the database 460 may be damaged due to an unexpected system or hardware error during operation of the electronic device 400. According to an embodiment, when the header or schema of the database 460 is damaged, critical metadata may not be accessed, so that access to the database 460 may be impossible. According to an embodiment, even when some data in the database 460 is damaged, the remaining data may not be accessed, so that the database 460 may be initialized. For example, if the database 460 is initialized, critical user data, such as existing user data, contacts, or messages, may be lost. According to an embodiment, the electronic device 400 may extract valid user data from the damaged database file through various database recovery schemes and constitute a new database file, thereby recovering the damaged database file.

Figure 5:
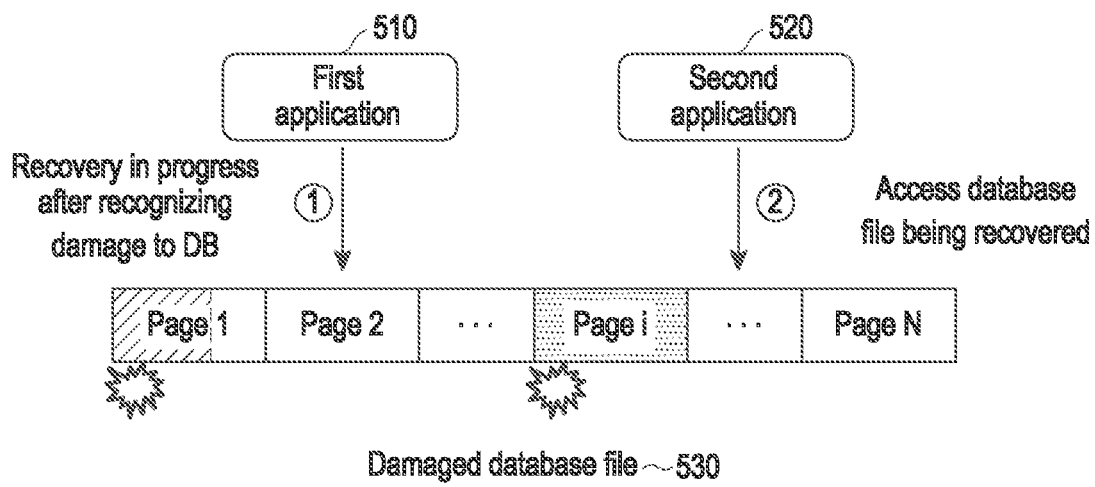
FIG. 5 is a view illustrating a case where a database file stored in an electronic device is damaged according to an embodiment.

FIG. 5 is a view illustrating a case where a database file stored in an electronic device is damaged according to an embodiment.

Referring to FIG. 5, a first application 510 run on the electronic device (e.g., the electronic device 101 of FIG. 1, the electronic device 101 of FIG. 3, or the electronic device 400 of FIG. 4) may access the database file 530 and then recognize damage to the database file 530 and perform recovery of the database file 530. For example, a first page (page 1) in the database file 530 may be partially damaged, and a whole ith page (page i) may be damaged.

According to an embodiment, a second application 520 run on the electronic device may access the damaged database file 530 to access the damaged database file 530. According to an embodiment, when the second application 520 accesses the database file 530 while the first application 510 recovers the database file 530, the recovery process in progress may not normally be performed. According to an embodiment, the second application 520 accessing the database file 530 while the first application 510 recovers the database file 530 may fail to normally recognize the database file 530, causing an additional error.

According to an embodiment, when the process conflicts between the applications 510 and 520, the recovery process for the database file may not normally be performed but may fail, causing loss of the critical user data.

According to an embodiment, the database file normally recovered by the recovery logic of the first application 510 may not perfectly match the database file before damaged, so that an unexpected operation may be caused in the second application 520 when the second application 520 accesses the recovered database file.

Figure 6:
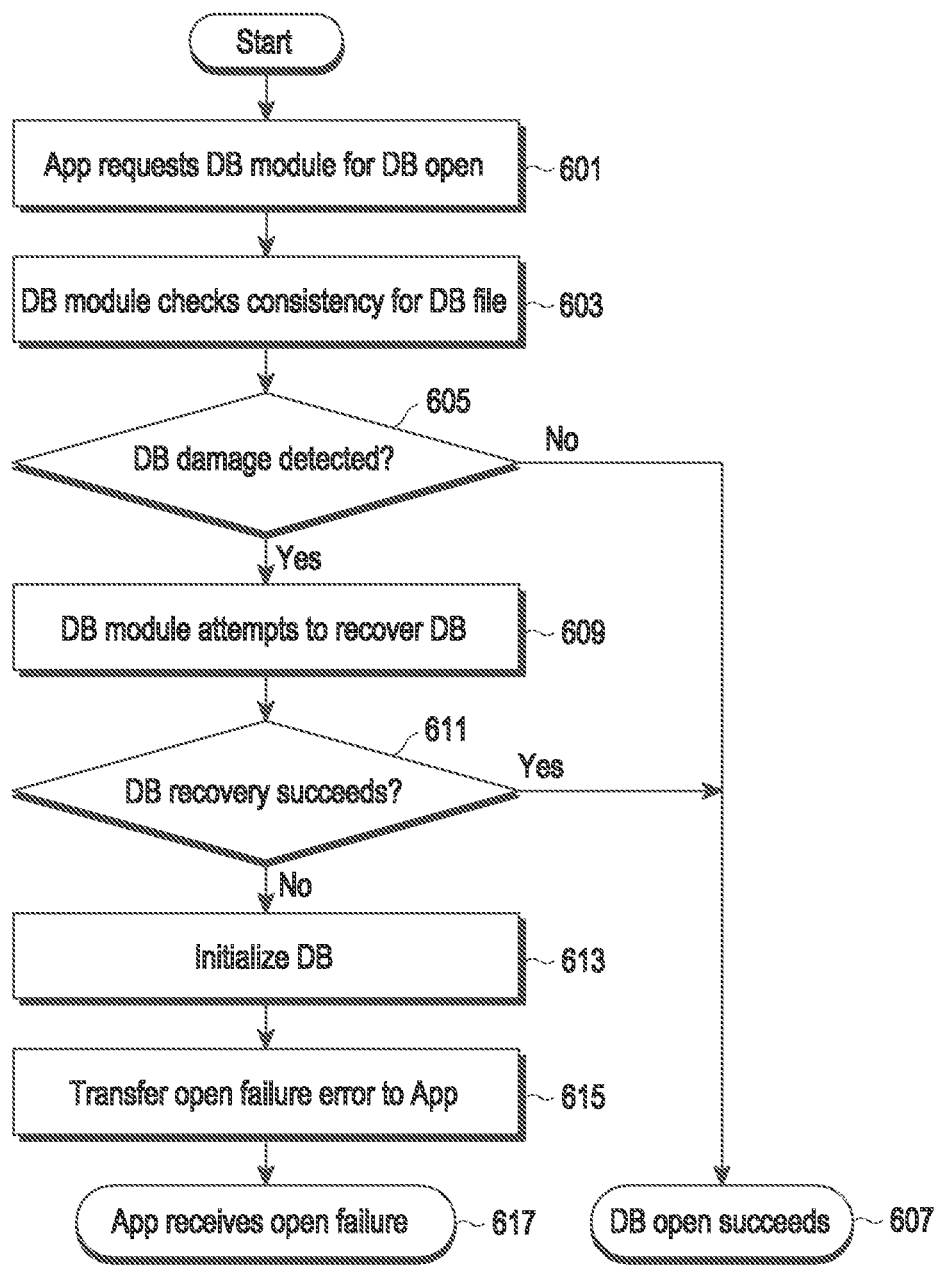
FIG. 6 is a view illustrating a recovery operation of a database module implemented in an electronic device according to an embodiment.

FIG. 6 is a view illustrating a recovery operation of a database module implemented in an electronic device according to an embodiment.

Referring to FIG. 6, in operation 601, an application (e.g., the application 410 of FIG. 4) run on the electronic device (e.g., the electronic device 101 of FIG. 1, the electronic device 101 of FIG. 3, or the electronic device 400 of FIG. 4) may send a request for database (DB) open to the database module (e.g., the DB module 415 of FIG. 4). In operation 603, the database module may check the consistency of the database (or database file). In operation 605, the database module may detect (or identify) whether the database (or database file) is damaged.

When the database (or database file) is detected as not damaged (no in 605) in operation 605, in operation 607, the application may determine that the DB open for which the database module has been requested succeeds. According to an embodiment, when the database (or database file) is not damaged, the database module may transmit a message indicating that DB open succeeds to the application.

When the database (or database file) is detected as damaged in operation 605 (yes in 605), in operation 609, the database module may attempt to recover the database (or database file). In operation 611, the database module may determine whether the recovery of the database (or database file) succeeds.

When it is determined in operation 611 that the recovery of the database (or database file) succeeds (yes in 611), in operation 607, the application may determine that the DB open for which the database module has been requested succeeds. According to an embodiment, when the recovery of the database (or database file) succeeds, the database module may transmit a message indicating that DB open succeeds to the application.

When the recovery of the database (or database file) does not succeed as a result of the determination in operation 611 (no in 611), in operation 613, the database (or database file) may be initialized. In operation 615, the database module may transfer a message indicating a DB open failure (or error) to the application. In operation 617, the application may receive the message indicating the DB open failure (or error) and know that DB open fails.

According to an embodiment, the application may transfer damage to the database (or database file) to the error handler (the error handler 430 of FIG. 4) included in the database module, and the error handler (the error handler 430 of FIG. 4) may request the recovery manager (the recovery manager 440 of FIG. 4) to recover the database (or database file). According to an embodiment, the recovery manager (the recovery manager 440 of FIG. 4) may transfer a recovery request to the native layer to perform recovery.

Figure 7:
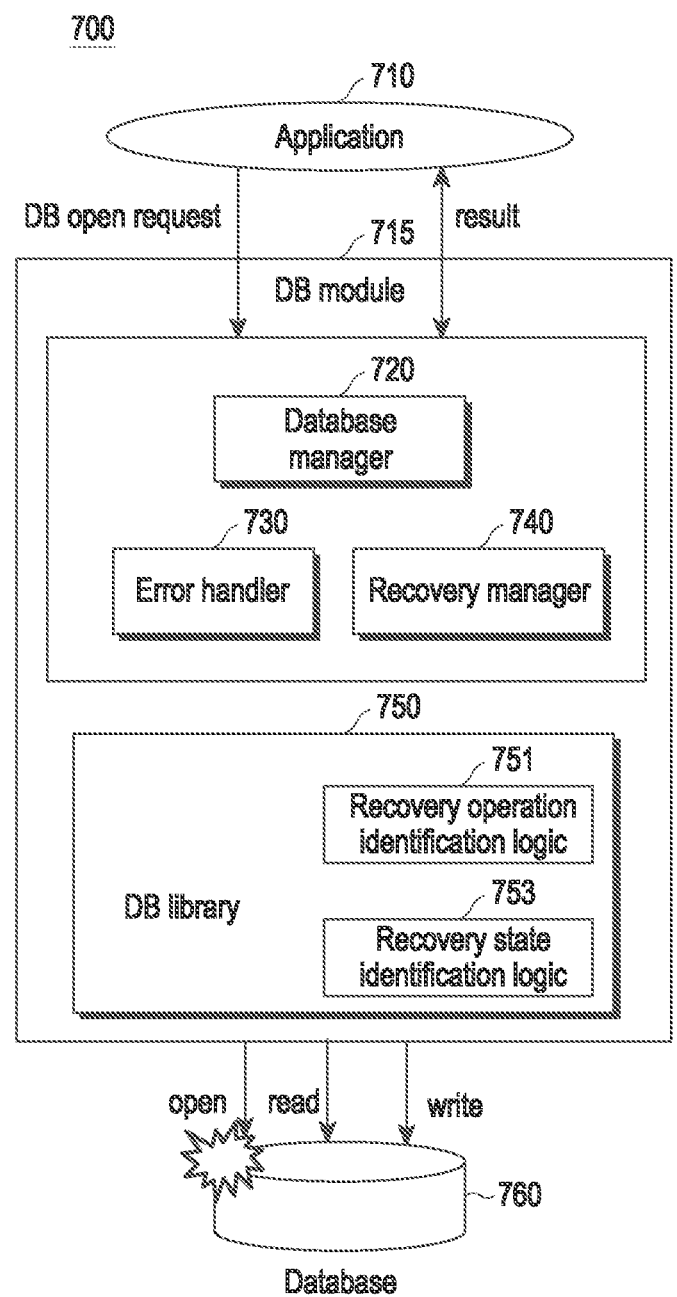
FIG. 7 is a view illustrating a recovery operation of a database stored in an electronic device according to an embodiment.

FIG. 7 is a view illustrating a recovery operation of a database stored in an electronic device according to an embodiment.

Referring to FIG. 7, an electronic device 700 (e.g., the electronic device 101 of FIG. 1, the electronic device 101 of FIG. 3, or the electronic device 400 of FIG. 4) may include an application 710, a database (DB) module 715, and a database 760. According to an embodiment, the DB module 715 may include a database manager 720 (e.g., the database manager 211 of FIG. 2 or the database manager 211 of FIG. 3) implemented on a first layer, an error handler 730 implemented on the first layer, a recovery manager 740 implemented on the first layer, and a DB library 750 implemented on a second layer. According to an embodiment, the first layer may be implemented as a Java layer used on Android OS, and the second layer may be implemented as a native layer used on Android OS.

According to an embodiment, the DB module 715 may be implemented in the processor (e.g., the processor 120 of FIG. 1 or the processor 120 of FIG. 3) in the electronic device. According to an embodiment, the DB module 715 may provide a function for performing processing of data between the application 10 and the database 60. According to an embodiment, the DB module 715 may perform generation, search or modification of the database 760 by the application 710. According to an embodiment, the DB module 715 may detect and/or restore database file errors in the database 760 when accessing the application 710.

According to an embodiment, the application 710 may be implemented as the application 146 of FIGS. 1 to 3. According to an embodiment, the error handler 730 may be included in the database manager 720. According to an embodiment, the recovery manager 740 may be implemented as the recovery manager 315 of FIG. 3, and the DB library 750 may be implemented as the DB library 310 of FIG. 3, and the database 760 may be implemented as the database 330 of FIG. 3.

According to an embodiment, the DB library 750 may include a recovery operation identification logic 751 and a recovery state identification logic 753. According to an embodiment, the recovery operation identification logic 751 may be for identifying a recovery operation for a database (or database file). According to an embodiment, the recovery state identification logic 753 may be for identifying whether a database (or database file) is in a recovered state.

According to an embodiment, when the database engine used on the Android OS is SQLite, the database manager 720 may be implemented using an SQLiteDatabase, and the DB library 750 may be implemented as libsqlite.so. According to an embodiment, the database manager 720 may process a code set existing on the DB framework according to an open and/or query command for the database 760 performed by the application 710. According to an embodiment, the DB library 750 may be implemented on the native layer where the programming language used in the Android OS is executed.

According to an embodiment, the application 710 may transmit a database open request to the DB module 715, and the DB module 715 may transmit an open, read, and/or write command to the database 760 through the file system (e.g., the file system 320 of FIG. 3). According to an embodiment, the DB module 715 may transmit, to the application 710, result information according to the open, read, and/or write command transmitted to the database 760.

According to an embodiment, the recovery operation identification logic 751 may identify that the application run on the electronic device 700 performs a recovery process on the database (or database file). According to an embodiment, the recovery operation identification logic 751 may allow the second application to wait without accessing the database (or database file) by identifying the recovery process on the database (or database file) performed when the first application requests DB open.

According to an embodiment, when the application run on the electronic device 700 completes the recovery process for the database (or database file), the recovery state identification logic 753 may identify that the database (or database file) is a recovered database (or database file). According to an embodiment, as the first application identifies that the database (or database file) is recovered by the recovery process performed when requesting DB open, the recovery state identification logic 753 may allow the second application to consider access to the database (or database file) when the database (or database file) is accessed.

Figure 8:
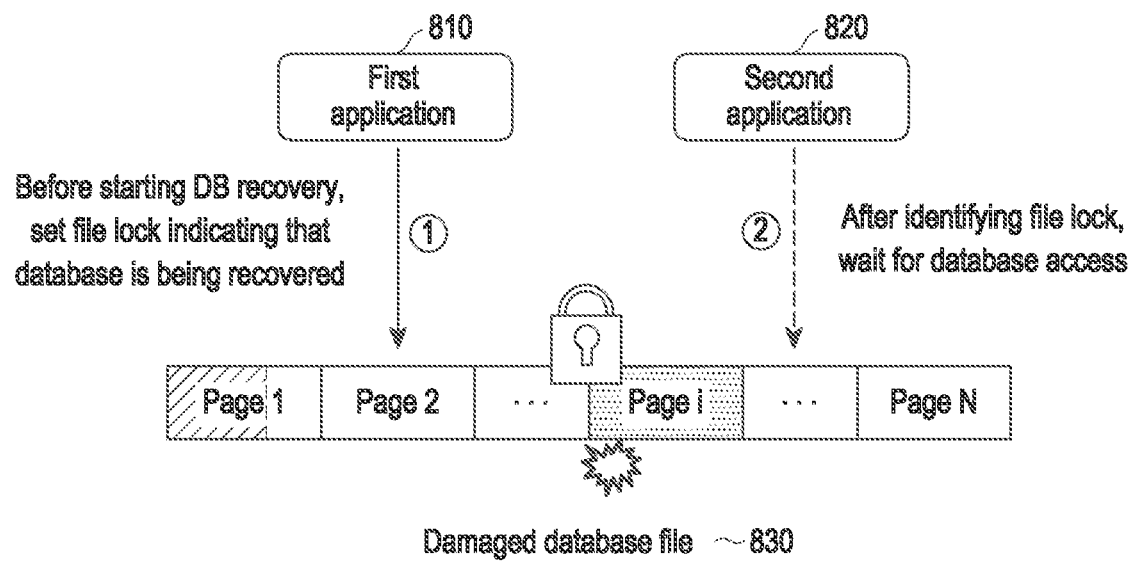
FIG. 8 is a view illustrating a recovery operation identification logic of an electronic device according to an embodiment.

FIG. 8 is a view illustrating a recovery operation identification logic of an electronic device according to an embodiment.

Referring to FIG. 8, a first application 810 run on an electronic device (e.g., the electronic device 101 of FIG. 1, the electronic device 101 of FIG. 3, the electronic device 400 of FIG. 4, or the electronic device 700 of FIG. 7) may access a database file 830 and, then, the database module (e.g., the DB module 715 of FIG. 7) may recognize (or identify) damage to the database file 830, and a recovery process for the database file 830 may be performed by the database module. For example, the database module may identify that part of the first page (page 1) in the database file 830 is damaged, and an entire ith page (page i) is damaged and recover them.

According to an embodiment, the database module may set a file lock indicating that the database file 830 is being recovered before starting the recovery process for the database file 830. According to an embodiment, the file lock may be an exclusive lock that may be uniquely set in the database file 830. According to an embodiment, the file lock may be generated and/or managed by the file system (the file system 320 of FIG. 3) in the electronic device.

According to an embodiment, the file lock may be implemented as a variable that may be set to true or false (e.g., a Boolean value). For example, if the variable of the file lock is set to true, it may be recognized that the file lock is set in the database file 830 and, if the variable of the file lock is set to false, it may be recognized that the file lock is not set in the database file 830.

According to an embodiment, the second application 820 run on the electronic device may identify the file lock set in the database file 830 when accessing the database file 830 being recovered and may wait without accessing the database file 830. For example, when accessing the database file 830, the second application 820 may identify that the variable of the file lock set in the database file 830 is true and wait without accessing the database file 830 until the variable of the file lock is changed to false. According to an embodiment, when recovery of the database file 830 is completed without separate modification, the second application 820 may seamlessly access the database file 830.

Figure 9:
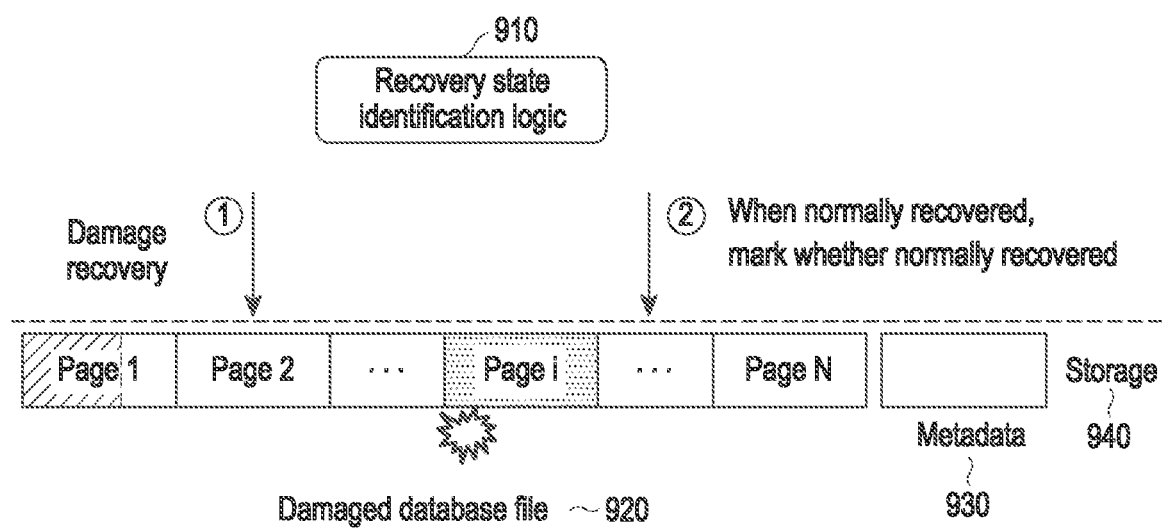
FIG. 9 is a view illustrating a recovery state identification logic of an electronic device according to an embodiment.

FIG. 9 is a view illustrating a recovery state identification logic of an electronic device according to an embodiment.

Referring to FIG. 9, after an application run on an electronic device (e.g., the electronic device 101 of FIG. 1, the electronic device 101 of FIG. 3, the electronic device 400 of FIG. 4, or the electronic device 700 of FIG. 7) accesses the database file 920, the database module may recognize damage to the database file 920 and perform a recovery process for the database file 920. For example, the database module may identify that part of the first page (page 1) in the database file 920 is damaged, and an entire ith page (page i) is damaged and recover them.

According to an embodiment, the database module may identify that the database file 920 is normally restored using the recovery state identification logic 910. According to an embodiment, after normally recovering the damaged database file 920, the database module may store information indicating that the database file 920 is normally recovered in the storage 940 through the attribute of the metadata 930 for the database file 920.

According to an embodiment, the electronic device may record whether the database file 920 is normally recovered through an extended attribute (e.g., xattr) of an index node (e.g., Mode) which is the metadata for system files, such as Linux system files. According to an embodiment, the extended attribute of an index node may mean a metadata area that may be additionally defined by the user. According to an embodiment, the key value of the extended attribute of an index node may be set to "recovered," indicating that the database file 920 is normally recovered.

According to an embodiment, another application run on the electronic device may identify a specific attribute of the metadata 930 for the database file 920, identify whether the database file 920 is normally recovered, recognize that the database file 920 is a recovered database file based on the result of the identification, and access the database file 920.

Figure 10:
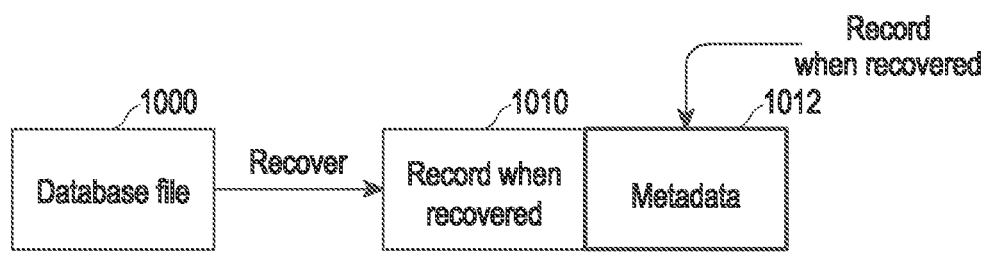
FIG. 10 is a view illustrating an example of metadata for a database file stored in an electronic device according to an embodiment.

FIG. 10 is a view illustrating an example of metadata for a database file stored in an electronic device according to an embodiment.

Referring to FIG. 10, the database module (e.g., the DB module 715 of FIG. 7) may identify that the database file 1000 (or database) is damaged and perform a recovery process on the damaged database file 1000. According to an embodiment, after recovering the damaged database file 1000, the database module may generate a recovered database file 1010 and metadata 1012 for the recovered database file 1010. According to an embodiment, the metadata 1012 may include attribute information indicating that the database file 1010 is a database file recovered and generated.

Figure 11:
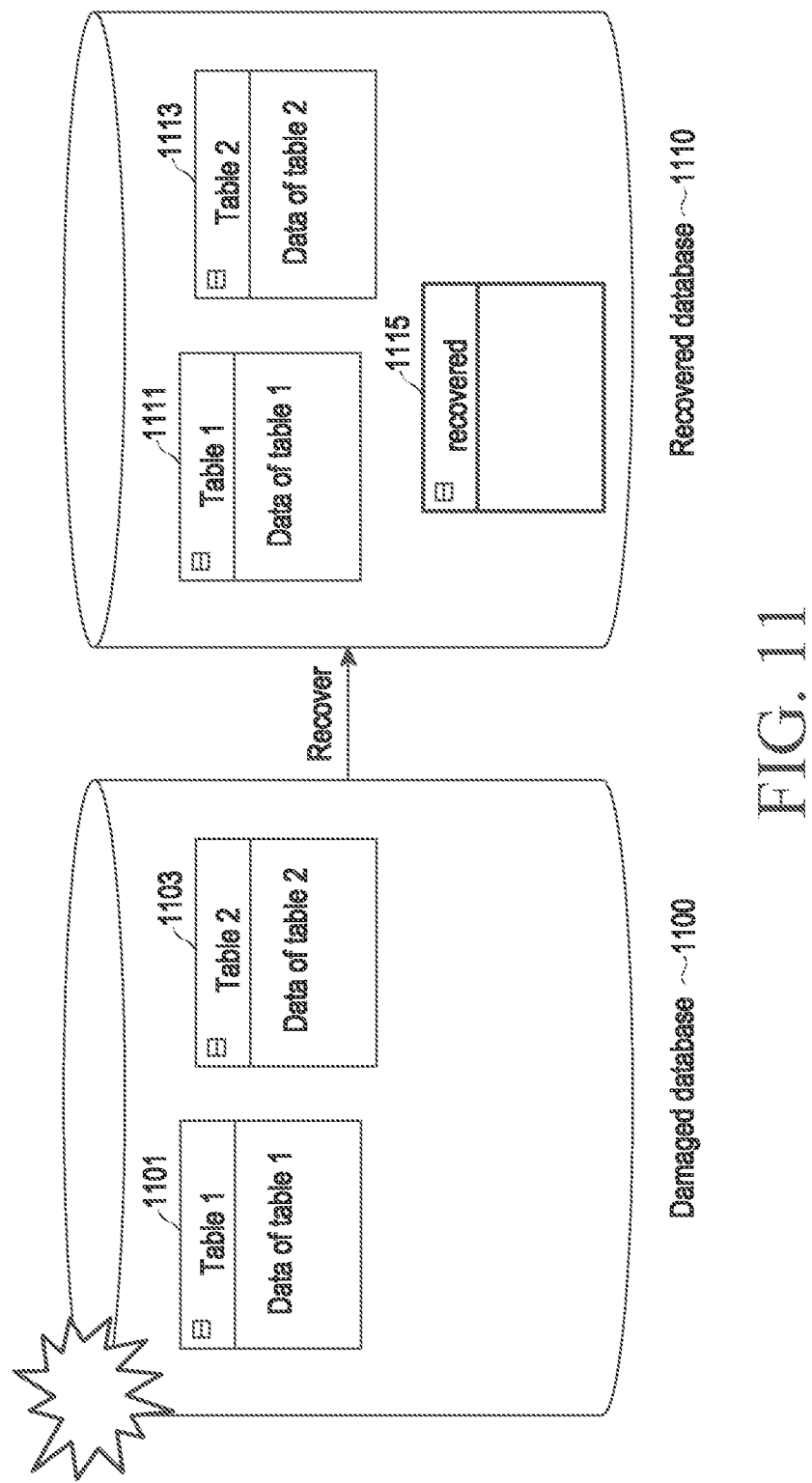
FIG. 11 is a view illustrating a recovery information table for a database file stored in an electronic device according to an embodiment.

FIG. 11 is a view illustrating a recovery information table for a database file stored in an electronic device according to an embodiment.

Referring to FIG. 11, after recovery of the database (or database file) is completed, the database module (e.g., the DB module 715 of FIG. 7) may add a table to the database (or database file) to record that the database (or database file) is recovered.

For example, a damaged database 1100 may include table one 1101 and table two 1103, and a recovered database 1110 may include table one 1111, table two 1113, and a recovery information table (recovered) 1115. For example, the recovery information table (recovered) 1115 may indicate that the database is recovered.

Figure 12:
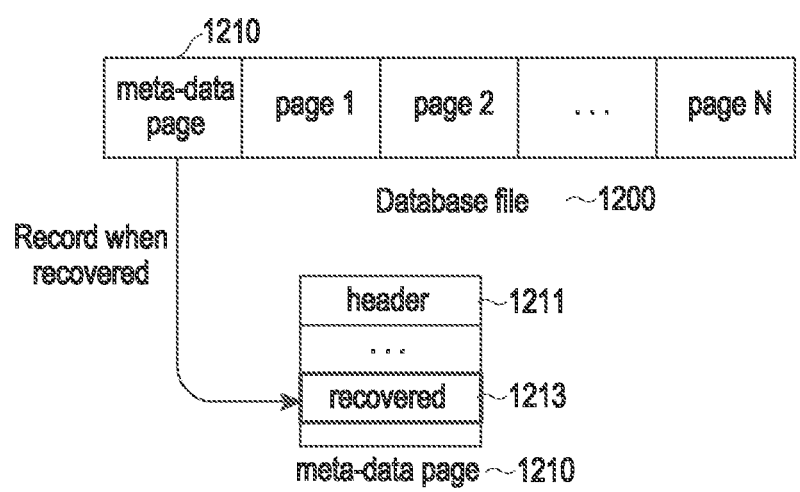
FIG. 12 is a view illustrating another example of metadata for a database file stored in an electronic device according to an embodiment.

FIG. 12 is a view illustrating another example of metadata for a database file stored in an electronic device according to an embodiment.

Referring to FIG. 12, a database file (or database) 1200 may be stored in a unit of a page. According to an embodiment, the first page of the database file 1200 may be a metadata page 1210, and the metadata page 1210 may store information, such as a database header 1211 and schema.

According to an embodiment, the metadata page 1210 may include recovery information (recovered) 1213 indicating that the database file is recovered, using a space not used in the metadata page 1210 in the database file 1200.

Figure 13:
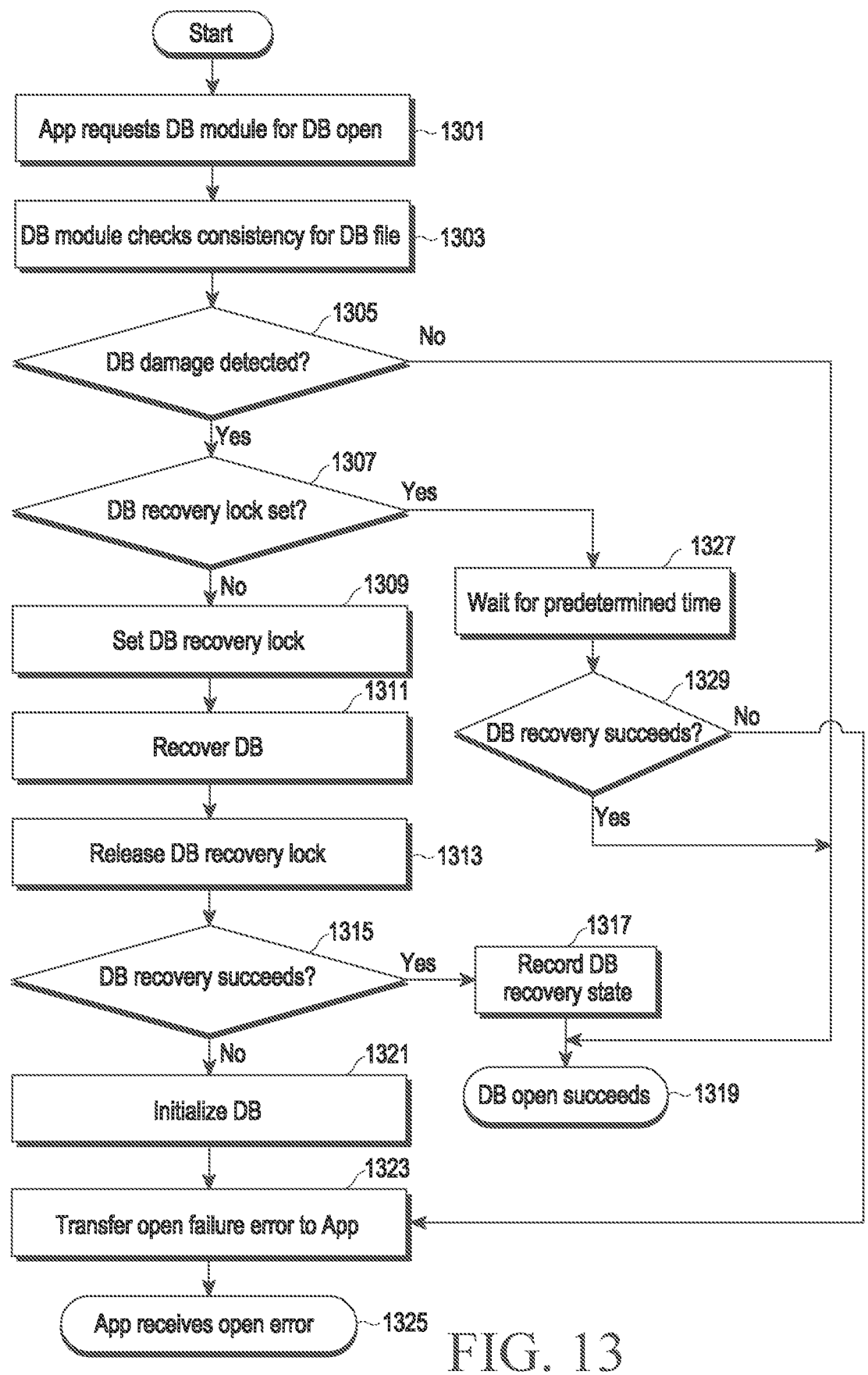
FIG. 13 is a view illustrating a database recovery operation identification logic of an electronic device according to an embodiment.

FIG. 13 is a view illustrating a database recovery operation identification logic of an electronic device according to an embodiment.

Referring to FIG. 13, in operation 1301, an application (e.g., the application 710 of FIG. 7) run on the electronic device (e.g., the electronic device 101 of FIG. 1, the electronic device 101 of FIG. 3, or the electronic device 700 of FIG. 7) may send a request for database (DB) open to the database module (e.g., the DB module 715 of FIG. 7). In operation 1303, the database module may check the consistency of the database (or database file). In operation 1305, the database module may detect whether the database (or database file) is damaged.

When the database (or database file) is detected as damaged as a result of the determination in operation 1305 (yes in 1305), in operation 1307, the database module may determine whether the database recovery lock is set. When it is determined in operation 1307 that the database recovery lock is not set (no in 1307), in operation 1309, the database module may set the database recovery lock. In operation 1311, the database module may recover the database (or database file) and, in operation 1313, the database module may release the database recovery lock.

In operation 1315, the database module may determine whether the recovery of the database (or database file) succeeds. When it is determined in operation 1315 that the recovery of the database (or database file) succeeds (yes in 1315), in operation 1317, the database module may record the database recovery state and, in operation 1319, the application may determine that the DB open for which the database module has been requested succeeds. According to an embodiment, when the recovery of the database (or database file) succeeds, the database module may transmit a message indicating that DB open succeeds to the application.

When the recovery of the database (or database file) does not succeed as a result of the determination in operation 1315 (no in 1315), in operation 1321, the database (or database file) may be initialized. In operation 1323, the database module may transfer a message indicating that a DB open failure (or error) to the application. In operation 1325, the application may receive the message indicating the DB open failure (or error) and know that DB open fails.

When it is determined in operation 1305 that damage to the database (or database file) is not detected (no in 1305) (e.g., when the database is not damaged), in operation 1319, the application may determine that the DB open for which the database module has been requested succeeds.

When it is determined in operation 1307 that the database recovery lock is set (yes in 1307), in operation 1327, the application may wait a predetermined time. In operation 1329, the database module may determine whether the recovery of the database (or database file) succeeds. When it is determined in operation 1329 that the recovery of the database (or database file) succeeds (yes in 1329), in operation 1319, the application may determine that the DB open for which the database module has been requested succeeds. According to an embodiment, when the recovery of the database (or database file) succeeds, the database module may transmit a message indicating that DB open succeeds to the application.

When the recovery of the database (or database file) does not succeed as a result of the determination in operation 1329 (no in 1329), in operation 1323, the database module may transfer a message indicating DB open failure (or error) to the application. Thereafter, in operation 1325, the application may receive the message indicating the DB open failure (or error) and know that DB open fails.

According to an embodiment, if damage to the database (or database file) occurs when the application accesses the database (or database file), a logic for identifying whether the database (or database file) recovery operation is executed may be performed.

According to an embodiment, the database recovery operation identification logic may be performed using a database recovery lock. According to an embodiment, the database recovery lock may be a file lock and may be a lock (exclusive lock) that may be uniquely set for the database file. According to an embodiment, before starting the database recovery, the database recovery lock may be set. According to an embodiment, when another application detects damage to the database (or database file), it is possible to determine whether the database recovery operation is being performed by identifying whether the database recovery lock is set.

According to an embodiment, when recovery of the database (or database file) is successfully completed, information about the database (or database file) recovery state may be recorded on the metadata (e.g., the extended attribute area of the Linux system) for the database file. According to an embodiment, if recording of the database (or database file) recovery state is completed, the database recovery lock may be released.

Figure 14A:
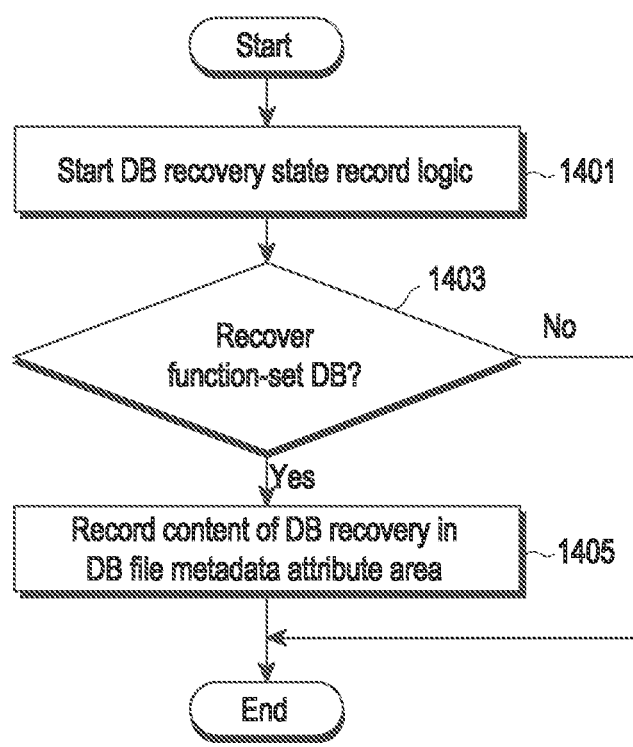
FIGS. 14A and 14B are views illustrating an example of a database recovery state identification logic of an electronic device according to an embodiment.
Figure 14B:
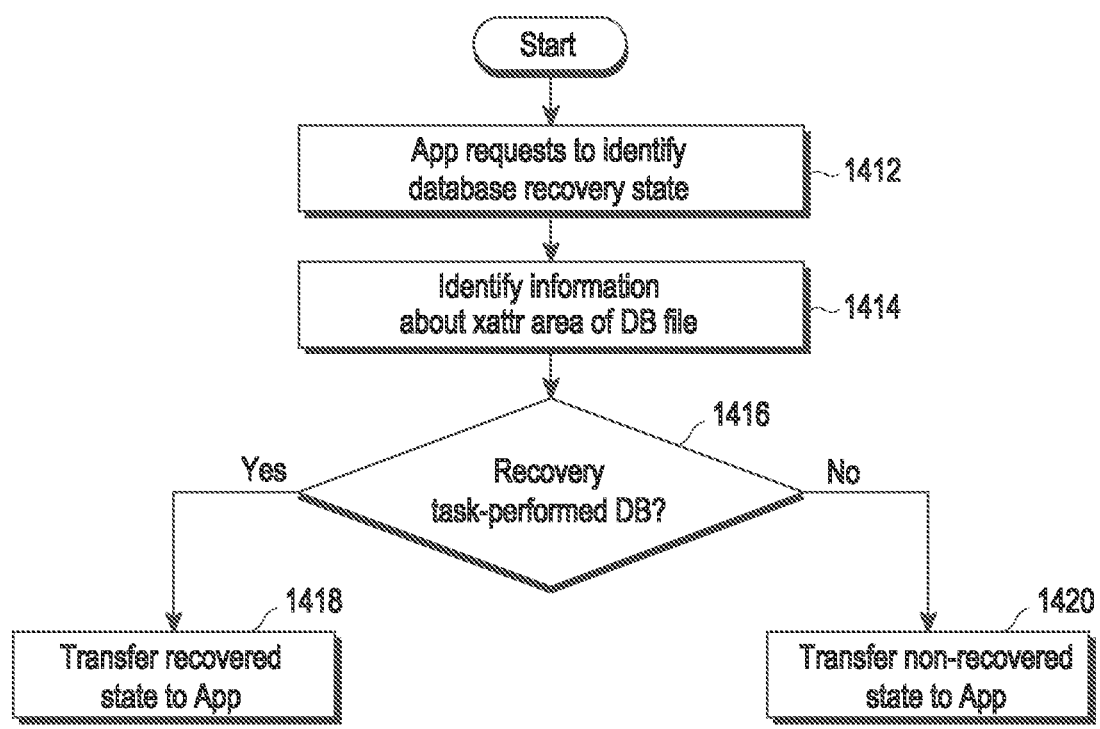

FIGS. 14A and 14B are views illustrating an example of a database recovery state identification logic of an electronic device according to an embodiment.

Referring to FIG. 14A, in operation 1401, an electronic device (e.g., the electronic device 101 of FIG. 1, the electronic device 101 of FIG. 3, or the electronic device 700 of FIG. 7) may start a database (DB) recovery state recording logic (e.g., the recovery state identification logic 753 of FIG. 7) and, in operation 1403, the electronic device may identify whether the DB is a DB for which the DB recovery function has been set.

When it is determined in operation 1403 that the DB is a DB for which the DB recovery function has been set, in operation 1405, the electronic device may record the content of the DB recovery in the metadata area (e.g., the xattr area of the linux system) of the DB file.

Referring to FIG. 14B, in operation 1412, the application (e.g., the application 710 of FIG. 7) run on the electronic device may request the database module (e.g., the DB module 715 of FIG. 7) to identify the DB recovery state. In operation 1414, the database module may identify information about the metadata area (e.g., the xattr area of the linux system) of the DB file and, in operation 1416, the database module may determine whether the DB is a DB for which recovery task has been performed. According to an embodiment, the database module may fetch the entire xattr information of the database file to identify the database recovery state and then identify whether database recovery record is stored in the xattr information.

When it is determined in operation 1416 that the DB is a DB for which the recovery task has been performed, in operation 1418, the database module may transfer a message indicating that the DB is in a recovered state to the application. When it is determined in operation 1416 that the DB is not a DB for which recovery task has been performed, in operation 1420, the database module may transfer a message indicating that the DB is in a non-recovered state to the application.

Figure 15A:
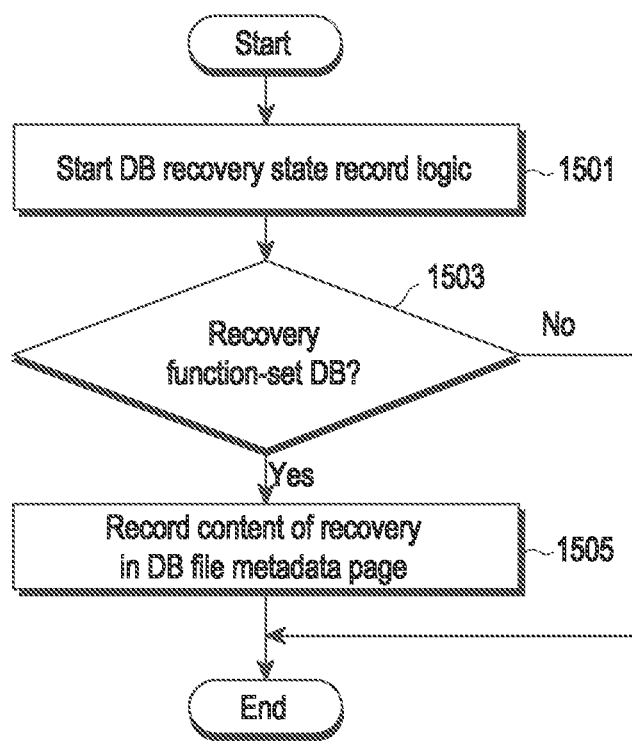
FIGS. 15A and 15B are views illustrating another example of a database recovery state identification logic of an electronic device according to an embodiment.
Figure 15B:
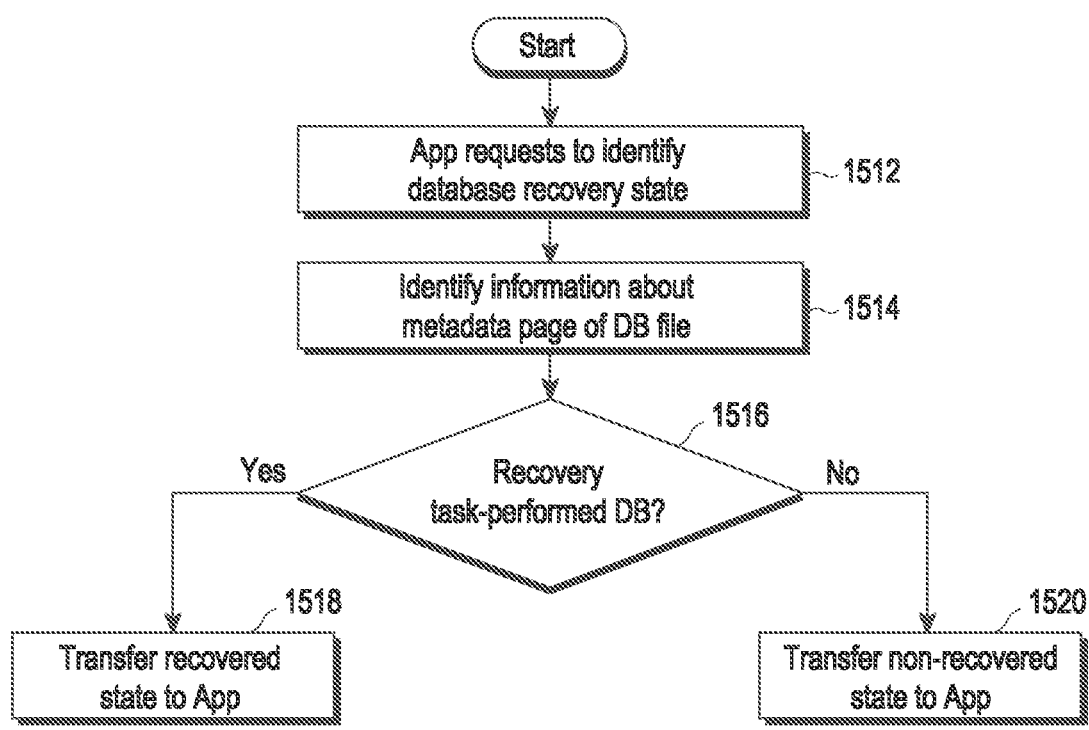

FIGS. 15A and 15B are views illustrating another example of a database recovery state identification logic of an electronic device according to an embodiment.

Referring to FIG. 15A, in operation 1501, an electronic device (e.g., the electronic device 101 of FIG. 1, the electronic device 101 of FIG. 3, or the electronic device 700 of FIG. 7) may start a database (DB) recovery state recording logic (e.g., the recovery state identification logic 753 of FIG. 7) and, in operation 1503, the electronic device may identify whether the DB is a DB for which the DB recovery function has been set.

When it is determined in operation 1503 that the DB is a DB for which the DB recovery function has been set, in operation 1505, the electronic device may record the content of the DB recovery in the metadata page of the DB file.

Referring to FIG. 15B, in operation 1512, the application (e.g., the application 710 of FIG. 7) run on the electronic device may request the database module (e.g., the DB module 715 of FIG. 7) to identify the DB recovery state. In operation 1514, the database module may identify information about the metadata page of the DB file and, in operation 1516, the database module may determine whether the DB is a DB for which a recovery task has been performed.

When it is determined in operation 1516 that the DB is a DB for which the recovery task has been performed, in operation 1518, the database module may transfer a message indicating that the DB is in a recovered state to the application. When it is determined in operation 1516 that the DB is not a DB for which recovery task has been performed, in operation 1520, the database module may transfer a message indicating that the DB is in a non-recovered state to the application.

Figure 16A:
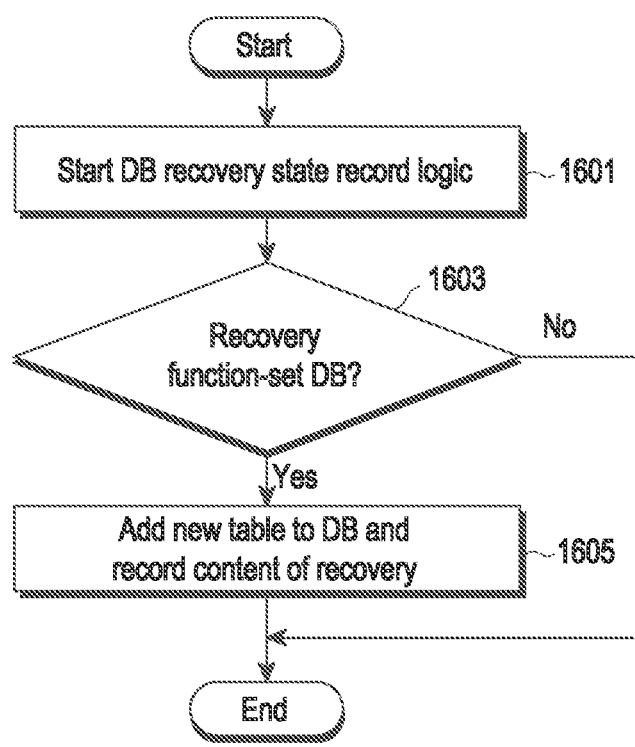
FIGS. 16A and 16B are views illustrating another example of a database recovery state identification logic of an electronic device according to an embodiment.
Figure 16B:
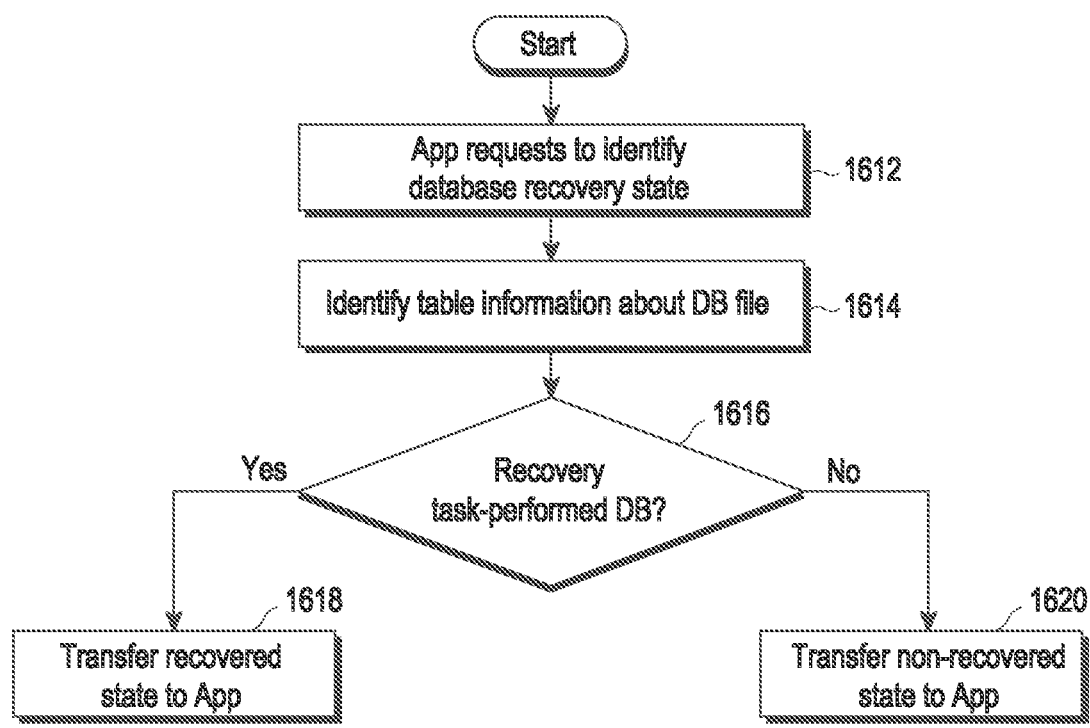

FIGS. 16A and 16B are views illustrating another example of a database recovery state identification logic of an electronic device according to an embodiment.

Referring to FIG. 16A, in operation 1601, an electronic device (e.g., the electronic device 101 of FIG. 1, the electronic device 101 of FIG. 3, or the electronic device 700 of FIG. 7) may start a database (DB) recovery state recording logic (e.g., the recovery state identification logic 753 of FIG. 7) and, in operation 1603, the electronic device may identify whether the DB is a DB for which the DB recovery function has been set.

When it is determined in operation 1603 that the DB is a DB for which the DB recovery function has been set, in operation 1605, the electronic device may add a new table to the DB and record the content of the DB recovery.

Referring to FIG. 16B, in operation 1612, the application (e.g., the application 710 of FIG. 7) run on the electronic device may request the database module (e.g., the DB module 715 of FIG. 7) to identify the DB recovery state. In operation 1614, the database module may identify table information of the DB and, in operation 1616, the database module may determine whether the DB is a DB for which recovery task has been performed.

When it is determined in operation 1616 that the DB is a DB for which the recovery task has been performed, in operation 1618, the database module may transfer a message indicating that the DB is in a recovered state to the application. When it is determined in operation 1616 that the DB is not a DB for which a recovery task has been performed, in operation 1620, the database module may transfer a message indicating that the DB is in a non-recovered state to the application.

According to an embodiment, an electronic device (e.g., the electronic device 101 of FIG. 1, the electronic device 101 of FIG. 3, or the electronic device 700 of FIG. 7) may include a memory (e.g., the memory 130 of FIG. 1 or the memory 130 of FIG. 3) including a database file and at least one processor (e.g., the processor 120 of FIG. 1, the processor 120 of FIG. 3, or the DB module 715 of FIG. 7) connected to the memory.

According to an embodiment, the at least one processor may identify damage to the database file while a first application run on the electronic device accesses the database file. According to an embodiment, the at least one processor may control a second application run on the electronic device to wait without accessing the database file until recovery of the damaged database file is completed. According to an embodiment, the at least one processor may record recovery state information indicating that the database file is recovered if the recovery of the damaged database file is completed. According to an embodiment, the at least one processor may control the second application to access the recovered database file based on the recovery state information.

According to an embodiment, the at least one processor may set a file lock on the damaged database file to indicate that the database file is being recovered. According to an embodiment, the at least one processor may recover the damaged database file. According to an embodiment, the file lock may be an exclusive lock uniquely set for the database file. According to an embodiment, the at least one processor may release the file lock for the database file if the recovery of the damaged database file succeeds.

According to an embodiment, if the recovery state information is set to a first value, it may indicate that the database file is recovered, and if the recovery state information is set to a second value, it may indicate that the database file is not recovered. According to an embodiment, the recovery state information may be implemented as a user defined attribute included in metadata for the database file. According to an embodiment, the user defined attribute may be set as an Mode xattr used in a linux system. According to an embodiment, the recovery state information may be implemented as a table included in the recovered database file. According to an embodiment, the database file may be constituted of a plurality of pages, and the recovery state information may be included in a first page in the database file.

According to an embodiment, the at least one processor may include a database library (e.g., the DB library 750 of FIG. 7). The database library may be set to include a first logic (e.g., the recovery operation identification logic 751 of FIG. 7) for identifying a recovery operation for the database file and a second logic (e.g., the recovery state identification logic 733 of FIG. 7) for identifying a recovery state for the database file.

What is claimed is:
1. An electronic device comprising:
at least one processor including processing circuitry; and
memory including one or more storage mediums storing instructions that, when executed by the at least one processor individually or collectively, cause the electronic device to:
receive a request from a first application running on the electronic device to open a database file, wherein the database file is stored in the memory,
identify that the database file is damaged as a damaged database file responsive to the first application running on the electronic device requesting to open the database file,
set a file lock on the damaged database file to indicate that the database file is being recovered,
identify a second application running on the electronic device that wants to access the damaged database file while recovering the database file,
based on the file lock, identify that the database file is being recovered and control the second application to wait without accessing the damaged database file until recovery of the damaged database file is completed,
record recovery state information indicating that the damaged database file is recovered as a recovered database file based on identifying that the recovery of the damaged database file is completed,
release the file lock for the database file based on the recovery of the damaged database file succeeding and after completion of recording the recovery state information, and control the second application to access the recovered database file based on the recovery state information, wherein the recovered database file is accessible by the first application.

2. The electronic device of claim 1, wherein the instructions, when executed by the processing circuitry individually or collectively, cause the electronic device to recover the damaged database file using the first application accessing on the database file.

3. The electronic device of claim 1, wherein the file lock is an exclusive lock uniquely set for the database file.

4. The electronic device of claim 1,
wherein based on the recovery state information being set to a first value, the first value indicates that the damaged database file is recovered, and
based on the recovery state information being set to a second value, the second value indicates that the damaged database file is not recovered.

5. The electronic device of claim 1, wherein the recovery state information is implemented as a user defined attribute included in metadata for the database file.

6. The electronic device of claim 5, wherein the user defined attribute is set as an extended attribute of an index node of a file system.

7. The electronic device of claim 1, wherein the recovery state information is implemented as a table included in the recovered database file.

8. The electronic device of claim 1,
wherein the database file is constituted of a plurality of pages, and
wherein the recovery state information is included in a first page in the database file.

9. The electronic device of claim 1,
wherein the at least one processor includes a database library, and
wherein the database library is set to include a first logic for identifying a recovery operation for the damaged database file and a second logic for identifying a recovery state for the damaged database file.

10. A method for operating an electronic device, the method comprising:
receiving a request from a first application running on the electronic device to open a database file, wherein the database file is stored in memory of the electronic device;
identifying, by at least one processor of the electronic device executing a plurality of instructions stored in a memory of the electronic device, that the database file is damaged as a damaged database file responsive to a first application running on the electronic device requesting to open the database file;
setting a file lock on the damaged database file to indicate that the database file is being recovered;
identifying a second application running on the electronic device that wants to access the damaged database file while recovering the database file;
based on the lock, identifying that the database file is being recovered and controlling, by the at least one processor of the electronic device, the second application to wait without accessing the damaged database file until recovery of the damaged database file is completed;
recording, by the at least one processor of the electronic device, recovery state information indicating that the damaged database file is recovered as a recovered database file based on identifying that the recovery of the damaged database file is completed;
releasing the file lock for the database file based on the recovery of the damaged database file succeeding and after completion of recording the recovery state information; and
controlling, by the at least one processor of the electronic device, the second application to access the recovered database file based on the recovery state information, wherein the recovered database file is accessible by the first application.

11. The method of claim 10, further comprising:
recovering, by the at least one processor, the damaged database file using the first application accessing on the database file.

12. The method of claim 10, wherein the file lock is an exclusive lock uniquely set for the database file.

13. The method of claim 10,
wherein based on the recovery state information being set to a first value, the first value indicates that the damaged database file is recovered, and
based on the recovery state information being set to a second value, the second value indicates that the damaged database file is not recovered.

14. The method of claim 10, wherein the recovery state information is implemented as a user defined attribute included in metadata for the database file.

15. The method of claim 14, wherein the user defined attribute is set as an extended attribute of an index node of a file system.

16. The method of claim 10, wherein the recovery state information is implemented as a table included in the recovered database file.

17. The method of claim 10,
wherein the database file is constituted of a plurality of pages, and
wherein the recovery state information is included in a first page in the database file.

18. A computer program product comprising a non-transitory storage medium storing instructions that, when executed by at least one processor of an electronic device individually or collectively, cause the electronic device to perform a plurality of operations, the plurality of operations comprising:
receiving a request from a first application running on the electronic device to open a database file, wherein the database file is stored in memory of the electronic device;
identifying that the database file stored in a memory of the electronic device is damaged as a damaged database file responsive to a first application running on the electronic device requesting to open the database file;
setting a file lock on the damaged database file to indicate that the database file is being recovered;
identifying a second application running on the electronic device that wants to access the damaged database file while recovering the database file;
based on the lock, identifying that the database file is being recovered and controlling the second application to wait without accessing the damaged database file until recovery of the damaged database file is completed;
recording recovery state information in the electronic device indicating that the damaged database file is recovered as a recovered database file based on identifying that the recovery of the damaged database file is completed;

releasing the file lock for the database file based on the recovery of the damaged database file succeeding and after completion of recording the recovery state information; and controlling the second application to access the recovered database file based on the recovery state information, wherein the recovered database file is accessible by the first application.

\* \* \* \* \*